United States Patent
Sato

(10) Patent No.: US 9,363,403 B2
(45) Date of Patent: Jun. 7, 2016

(54) IMAGE FORMING APPARATUS, CONTROL METHOD, AND STORAGE MEDIUM STORING A PROGRAM

(71) Applicant: CANON KABUSHIKI KAISHA, Tokyo (JP)

(72) Inventor: Junji Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/557,550

(22) Filed: Dec. 2, 2014

(65) Prior Publication Data
US 2015/0172497 A1 Jun. 18, 2015

(30) Foreign Application Priority Data
Dec. 12, 2013 (JP) .................. 2013-257398

(51) Int. Cl.
G06F 3/12 (2006.01)
H04N 1/00 (2006.01)
H04N 1/32 (2006.01)
G06K 15/00 (2006.01)

(52) U.S. Cl.
CPC ........ *H04N 1/00933* (2013.01); *G06K 15/4005* (2013.01); *G06K 15/4055* (2013.01); *H04N 1/00896* (2013.01); *H04N 1/00899* (2013.01); *H04N 1/32101* (2013.01); *H04N 2201/3202* (2013.01)

(58) Field of Classification Search
USPC ........................................ 358/1.15
See application file for complete search history.

(56) References Cited

U.S. PATENT DOCUMENTS 8,390,844 B2 * 3/2013 Sekiya .................. 358/1.15
9,049,331 B2 * 6/2015 Nasu
2006/0184543 A1 * 8/2006 Fukuta .................. 707/10

FOREIGN PATENT DOCUMENTS

JP 2006-246445 A 9/2006

* cited by examiner

*Primary Examiner* — Marivelisse Santiago Cordero
*Assistant Examiner* — Neil R McLean
(74) *Attorney, Agent, or Firm* — Carter, DeLuca, Farrell & Schmidt, LLP

(57) ABSTRACT

When it is determined that transmission of an execution history corresponding to at least one job to an external apparatus can be completed before a transition time at which a transition from a first operation mode, in which a job can be executed, to a second operation mode, in which the power consumption amount is less than that of the first operation mode, transmission control is performed such that transmission of the execution history to an external apparatus is started.

11 Claims, 8 Drawing Sheets

F I G. 5

| ATTRIBUTE INFORMATION | JOB HISTORY ID | 00003 |
|---|---|---|
| | JOB TYPE | PRINT |
| | JOB EXECUTION USER | User001 |
| | JOB START TIME | 2007/9/30 17:13 |
| | JOB EXECUTION DEVICE | PRINTER 102 |
| | NUMBER OF PAGES | 3 |
| | JOB EXECUTION RESULT | SUCCESS |
| | ... | ... |
| CONTENT INFORMATION | IMAGE DATA | ... |
| | | ... |
| | | ... |
| | TEXT DATA | ... |
| | | ... |
| | | ... |

| SIZE | COLOR SETTING | AMOUNT OF TRANSMISSION TIME PER PAGE (MILLISECONDS) |
|------|---------------|------------------------------------------------------|
| A3   | COLOR         | 3000                                                 |
| A3   | MONOCHROME    | 2000                                                 |
| A4   | COLOR         | 750                                                  |
| A4   | MONOCHROME    | 500                                                  |
| ...  | ...           | ...                                                  |

IMAGE FORMING APPARATUS, CONTROL METHOD, AND STORAGE MEDIUM STORING A PROGRAM

BACKGROUND OF THE INVENTION

1. Field of the Invention

The present invention relates to an image forming apparatus configured to hold a job execution history, a control method, and a storage medium configured to store a program.

2. Description of the Related Art

Conventionally, there are job history inspection systems in which, when a job such as making a copy, transmitting or receiving a fax, or printing in an image forming apparatus such as a printer, scanner, or digital multifunction printer is performed, the job information is stored in a database as a job history. With a job history inspection system, it is possible to search for job histories stored in the database and to reference the contents of jobs that have been executed in the past.

With a job history inspection system, job histories are temporarily accumulated in a storage device of an image forming apparatus, and the image forming apparatus transmits the job histories to a server at a predetermined timing. For example, with a job history inspection system, it is possible to realize an operation of transmitting job histories from the image forming apparatus to the server in a focused manner during the night so that the network load caused by transmitting the job histories does not influence business operations.

On the other hand, in the interest of electricity conservation and ecology, an operation of setting the image forming apparatus to a sleep mode (low energy consumption mode) during a time span when the image forming apparatus is not being used and transmitting the job histories during business hours is also considered. The sleep mode is a function that is also referred to as power conservation mode, standby mode, and the like, and it is a function of automatically interrupting certain functions when the image forming apparatus has not been used for a certain amount of time, so as to achieve a reduction in power consumption. In the case of the operation of transmitting the job histories during business hours, as long as the network bandwidth is sufficient, the network load caused by job history transmission can be prevented from influencing business operations. However, there is a problem in that the load caused by job history transmission processing on the image forming apparatus itself cannot be avoided, and during job history transmission processing, the amount of time for job execution processing increases and the amount of user waiting time increases.

Japanese Patent Laid-Open No. 2006-246445 discloses a technique of interrupting job history transmission if a job is being executed by an image forming apparatus. According to Japanese Patent Laid-Open No. 2006-246445, it is possible to prevent a case in which the amount of job execution processing time increases due to job history transmission processing.

However, with Japanese Patent Laid-Open No. 2006-246445, since job history transmission is controlled only depending on a status of execution of a job, it is thought that job history transmission will be executed regardless of the sleep setting time, and a transition to the sleep mode will not occur. Also, it is thought that even if the image forming apparatus gives more priority to the sleep mode than to job history transmission, sleep mode will be entered regardless of whether or not job history transmission is being performed.

SUMMARY OF THE INVENTION

The present invention provides an image forming apparatus that controls job history transmission based on a status of transition of the apparatus to a low power consumption mode, a control method, and a storage medium storing a program.

The present invention in one aspect provides an image forming apparatus an image forming apparatus configured to execute a job, the image forming apparatus comprising: a storage unit configured to store execution history information related to a job; an acquisition unit configured to acquire an amount of time until a transition time at which the image forming apparatus transitions from a first operation mode in which a job can be executed, to a second operation mode in which an amount of consumed power is less than that of the first operation mode; a transmission unit configured to transmit the execution history information stored in the storage unit to an external apparatus; and a transmission control unit configured to control start of transmission of an execution history included in the execution history information stored in the storage unit to the external apparatus by the transmission unit, wherein after a job is executed, in a case where it is determined based on the amount of time acquired by the acquisition unit that transmission of the execution history corresponding to at least one job to the external apparatus can be completed before the transition time, the transmission control unit performs control such that the transmission unit starts to transmit the execution history corresponding to the at least one job.

According to the present invention, job history transmission can be controlled based on a status of transition of the apparatus to a low power consumption mode.

Further features of the present invention will become apparent from the following description of exemplary embodiments with reference to the attached drawings.

BRIEF DESCRIPTION OF THE DRAWINGS

FIG. 5 is a diagram showing a job history that is to be transmitted to a data processing server.

DESCRIPTION OF THE EMBODIMENTS

Figure 1:
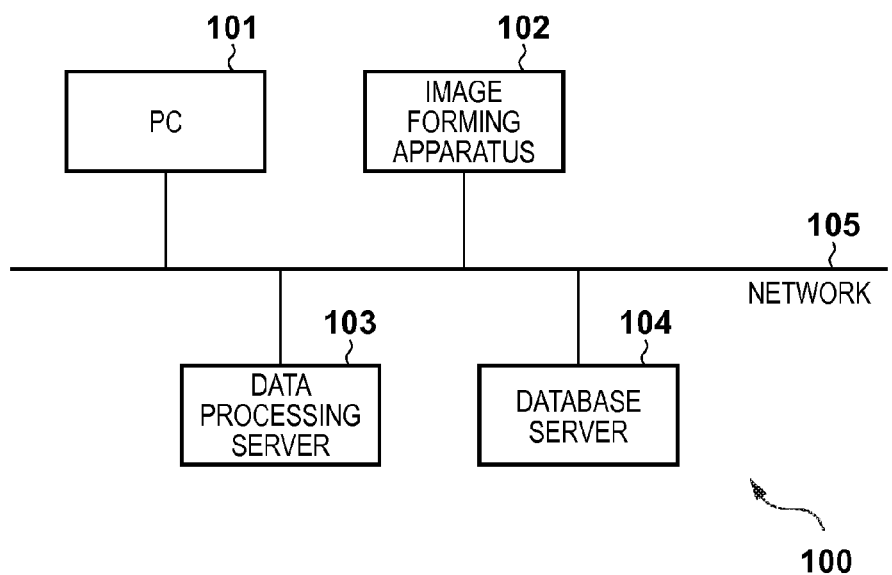
FIG. 1 is a block diagram showing a configuration of a job history inspection system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that constituent elements that are the same are denoted by the same reference numerals and descriptions thereof will not be repeated.

First Embodiment

FIG. 1 is a block diagram showing a configuration of a job history (record) inspection system according to the present invention. As shown in FIG. 1, in a system 100, a PC 101, an image forming apparatus 102, a data processing server 103, and a database server 104 are communicably connected together via a network 105.

The PC 101 uses a printer driver and the like to generate various types of jobs for causing the image forming apparatus 102 to execute printing, fax transmission, and the like, and transmits the jobs to the image forming apparatus 102. Job generation and transmission at such a time is performed according to a user instruction received via a user interface, for example. The PC 101, the data processing server 103, and the database server 104 are constituted by general-use PCs (information processing apparatus) or the like.

The image forming apparatus 102 is an image forming apparatus capable of executing a print job, a copy job, a scan job, a fax job, a transmission job, or the like according to a user operation. In order to realize these types of jobs, a so-called MFP (Multi Function Printer) may be used as the image forming apparatus 102. In the present embodiment, the image forming apparatus 102 includes a job history recording function according to which job execution history information obtained by executing the above-described types of jobs are stored in a storage region. Job execution history information corresponding to one job includes multiple job histories as shown in FIG. 5, which will be described later. Also, the image forming apparatus 102 includes a job history transmission function according to which control of transmission of a job history stored using the job history recording function to the data processing server 103 is executed based on the state of the image forming apparatus 102.

The data processing server 103 receives a job history transmitted via the network 105 from the image forming apparatus 102 using the job history transmission function. The data processing server 103 executes data processing with respect to the received job history and transmits the job history that was subjected to the data processing to the database server 104. Here, the data processing is processing for image resolution conversion, data compression, file format conversion, text data extraction by OCR, and image feature amount extraction, for example. Also, an image feature amount is information that characterizes an image, including brightness information, color information, edge information, and the like.

The database server 104 receives a job history transmitted from the data processing server 103 via the network 105 and stores it in a storage device. The database server 104 includes large-capacity storage constituted by one or more hard disk drives (HDD), and a database is constructed in the large-capacity storage. With such a configuration, the database server 104 can store, over the long term, a large number of job histories transmitted from the data processing server 103. Physical or logical configuration information and the like for storage is stored in the database server 104, and therefore other apparatuses on the network 105 need not be aware of this information. The database server 104 of the present embodiment need only include a storage device that can store job histories, and for example, a device having a file server function may be used as the database server 104.

The network 105 is a communication circuit for communicably connecting the PC 101, the image forming apparatus 102, the data processing server 103, and the database server 104 together, and a LAN or WAN is used therefor, for example. Also, a wireless communication network may be used as the network 105.

FIG. 1 shows that the PC 101, the image forming apparatus 102, the data processing server 103, and the database server 104 are constituted by one device each, but each may be constituted by multiple devices. Also, the functions of the PC 101, the data processing server 103, and the database server 104 may be configured in the same information processing apparatus. Also, the functions of the data processing server 103 and the database server 104 may be constituted in the same information processing apparatus.

Figure 2:
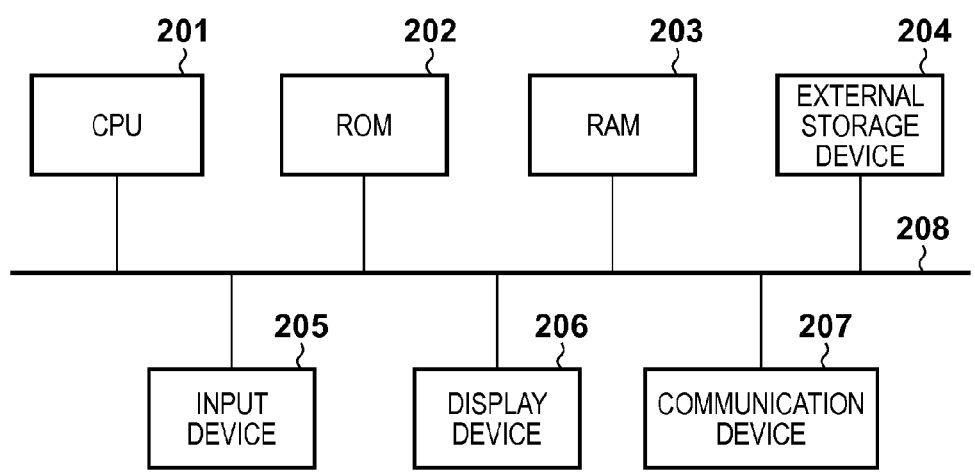
FIG. 2 is a diagram showing a hardware configuration of an information processing apparatus.

FIG. 2 is a diagram showing an example of a hardware configuration for the information processing apparatus of the PC 101, the data processing server 103, and the database server 104. A CPU 201 performs overall control of the information processing apparatus and can execute various types of calculation processing in data processing by controlling the units connected to a bus 208. A ROM 202 is a data read-only memory and stores basic control programs for the information processing apparatus, for example. A RAM 203 is a memory capable of reading and writing data and is used as a working memory for various types of calculation processing of the CPU 201, for example.

An external storage device 204 is used as a storage region for an operating system (OS) of the information processing apparatus, and permanent data and temporary data during execution of various types of application programs. A hard disk (HDD) or the like is used as the external storage device 204. In this case, although the data reading/writing speed is slower in comparison to the RAM 203, the external storage device 204 can store a large amount of data. Also, the external storage device 204 may be a device that can read/write data by loading an external medium such as a CD, DVD, or memory card.

An input device 205 is an operation unit for receiving a user operation of inputting characters or data and is a keyboard or pointing device, for example. A display device 206 is an apparatus for displaying various types of screens, and is a CRT or liquid crystal monitor, for example. For example, on the user interface screen displayed on the display device 206, the user inputs a print job execution instruction to the image forming apparatus 102 using the input device 205. A communication device 207 is a device for connecting the information processing apparatus to the network 105, connects the information processing apparatus to a LAN, and enables data communication by means of TCP/IP between the information processing apparatus and other apparatuses on the network 105.

Figure 3:
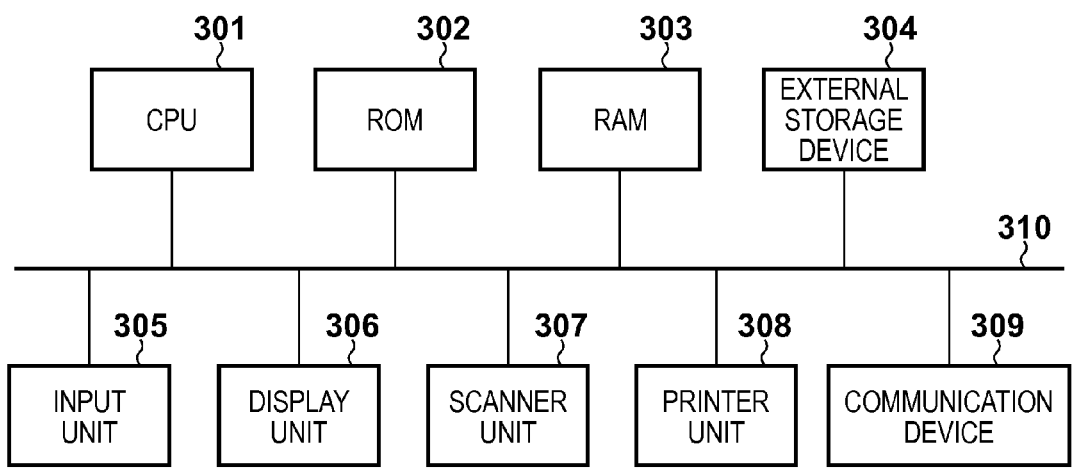
FIG. 3 is a diagram showing a hardware configuration of an image forming apparatus.

FIG. 3 is a diagram showing an example of a hardware configuration of the image forming apparatus 102. A CPU 301 performs overall control of the image forming apparatus 102 and can execute functions such as printing and fax transmission by controlling the units connected to a bus 310, for example. A ROM 302 is a data read-only memory and stores basic control programs for the image forming apparatus, for example. A RAM 303 is a memory capable of reading and writing data, and is used as a working memory for the CPU 301, for example.

An external storage device 304 is used as a storage region for permanent data and temporary data during execution of programs. A hard disk (HDD) or the like is used as the external storage device 304. For this reason, although the data reading/writing speed is slower in comparison to the RAM 303, the external storage device 304 can store a large amount of data. Also, the external storage device 304 may be a device that can read/write data by loading an external medium such as a CD, DVD, or memory card.

An input unit 305 is an operation unit for receiving a user operation of inputting characters or data, and is a number pad or physical keys, for example. A display apparatus 306 is an apparatus for displaying various screens, and is a liquid crystal panel, for example. For example, on a user interface screen displayed on the display apparatus 306, the user inputs a print job execution instruction to the image forming apparatus 102 using the input unit 305. Also, if the display apparatus 306 displays a touch panel, the user can input an instruction to execute copying or the like on the touch panel.

A scanner unit 307 includes a configuration for optically scanning an original placed on an original platen and a configuration for optically scanning multiple original sheets conveyed continuously from an automatic document feeder (ADF) at a fixed scanning position. A printer unit 308 includes a configuration for printing an image on a printing medium such as a printing sheet, based on image data. Various printing methods such as an electrophotographic method and an inkjet printing method are applicable as the configuration for printing. The image forming apparatus 102 can execute a copy function by performing printing using the printer unit 308 based on image data scanned by the scanner unit 307.

In addition, the image forming apparatus 102 includes an image processing unit that executes image processing for printing and various applications, such as color space conversion, mapping, binarization, interlacing, and underlayer removal on image data acquired from the scanner unit 307 or an external apparatus such as the PC 101.

Figure 4:
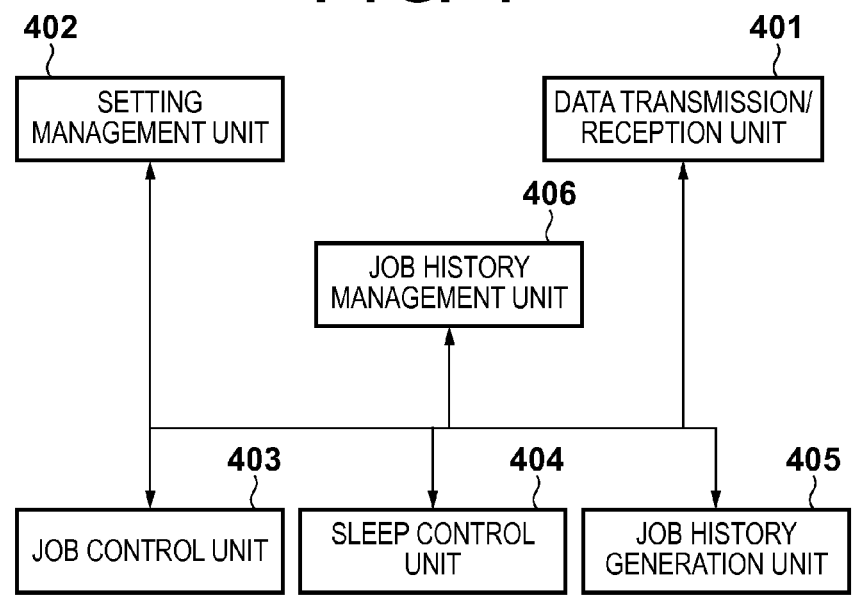
FIG. 4 is a diagram showing a software configuration of an image forming apparatus.

FIG. 4 is a diagram showing an example of a software configuration of the image forming apparatus 102. The software configuration shown in FIG. 4 is realized by the CPU 301 reading out a program stored in the ROM 302 to the RAM 303 and executing it, for example. A data transmission/reception unit 401 refers to processing for transmitting and receiving various types of data to and from the PC 101 and the data processing server 103. The data transmission/reception unit 401 transmits a job history generated by a job history generation unit 405 to the PC 101 and the data processing server 103 and receives jobs and job execution requests from the PC 101 and the data processing server 103, for example. A setting management unit 402 stores settings related to the execution of various functions by the image forming apparatus 102 in storage devices such as the ROM 302, the RAM 303, and the external storage device 304 and reads them out from the storage devices. Here, a setting is, for example, a copy setting for executing the copy function or a print setting for executing the print function. Also, a setting includes a setting related to the operation mode of the image forming apparatus 102 itself. For example, a setting includes an amount of transition time until a transition to a power source off state or a power conservation mode (sleep mode), in which if input of an operation is not received from a user for a predetermined amount of time, a power source unit (not shown) is controlled such that power to the units of the apparatus is partially restricted, and the overall amount of power consumed by the apparatus is reduced. A job control unit 403 executes various jobs by controlling the scanner unit 307 and the printer unit 308 based on a job execution request input using the display unit 306 or received by the data transmission/reception unit 401.

A sleep control unit 404 uses a timer to manage the amount of time until the image forming apparatus 102 transitions to the sleep mode, based on the setting value for the sleep mode transition time managed by the setting management unit 402, and on the status of control of units such as the scanner unit 307 by the job control unit 403. If the sleep control unit 404 detects with the timer that the transition time managed by the setting management unit 402 has been reached, power being supplied to the units of the image forming apparatus 102 is partially controlled such that the image forming apparatus 102 is caused to transition to the sleep mode or the power source off mode. A description will be given below taking the sleep mode as an example of an apparatus state in which the amount of power consumed is less than in a normal state in which various jobs can be executed.

After a job is executed by the job control unit 403, the job history generation unit 405 generates a job history. Job histories will be described later. A job history management unit 406 stores the job history generated by the job history generation unit 405 in the external storage device 304. Also, at a timing that will be described later in FIG. 8, the job history management unit 406 transmits the job history stored in the external storage device 304 to the data processing server 103 via the data transmission/reception unit 401. Also, the job history management unit 406 deletes job histories that have been transmitted to the data processing server 103 from the external storage device 304.

FIG. 5 is a diagram showing an example of a job history that the job history management unit 406 of the image forming apparatus 102 is to transmit to the data processing server 103. As shown in FIG. 5, a job history is constituted by attribute information regarding job execution, and content information that was subjected to job execution. For example, attribute information includes information such as a job history ID, a job type, a job execution user name, a job start time, a job execution device, number of pages, and a job execution result. The job history ID is identification information for identifying the present job history, and the job type indicates the type of job corresponding to the present job history ID, such as copying or printing, for example. The job execution user name is a name indicating the user who instructed execution of the job corresponding to the present job history ID.

The job start time indicates the date and time at which execution of the job corresponding to the present job history ID was started. The job start time is a time that is stored temporarily in a queue when the image forming apparatus 102 receives a print job from an external device, and then is read out from the queue for execution. The job execution device indicates the name of the device that executed the job corresponding to the present job history ID, and here, it indicates a printer (image forming apparatus) 102. As described above, the job history is transmitted to the data processing server 103. As a result, the data processing server 103 manages job histories received from multiple image forming apparatuses 102 that are connected to the network 105. At this time, the data processing server 103 can use the information regarding the "job execution device" to manage the job histories of the image forming apparatuses.

The number of pages indicates the number of pages subjected to the execution of the job corresponding to the present job history ID. The number of pages may be a logical number of pages corresponding to a predetermined image unit, and it may be a physical number of pages based on the printing medium. The job execution result indicates the result of executing the job corresponding to the present job history ID. The content information includes information regarding the text data and the image data that was subjected to the execution of the job corresponding to the present job history ID. The information is a storage position in the external storage device 304 for the image data and the text data, for example. Also, the content information includes content information corresponding to the number of pages indicated in the attribute information. The job history shown in FIG. 5 indicates that a user named "User001" executed a job of printing a document composed of 3 pages using the printer 102 at 5:13 pm on Sep. 30, 2007. Also, the execution results indicate that it was successful (printing was successful).

Also, regarding the job history shown in FIG. 5, one job corresponds to multiple job histories in some cases rather than corresponding to just one. In such a case, for example, job histories corresponding to the same job may have the same job history ID. Alternatively, it is possible to indicate correspondence to the same job by attaching a sub-number or the like to the job history ID.

Figures 6, 7:
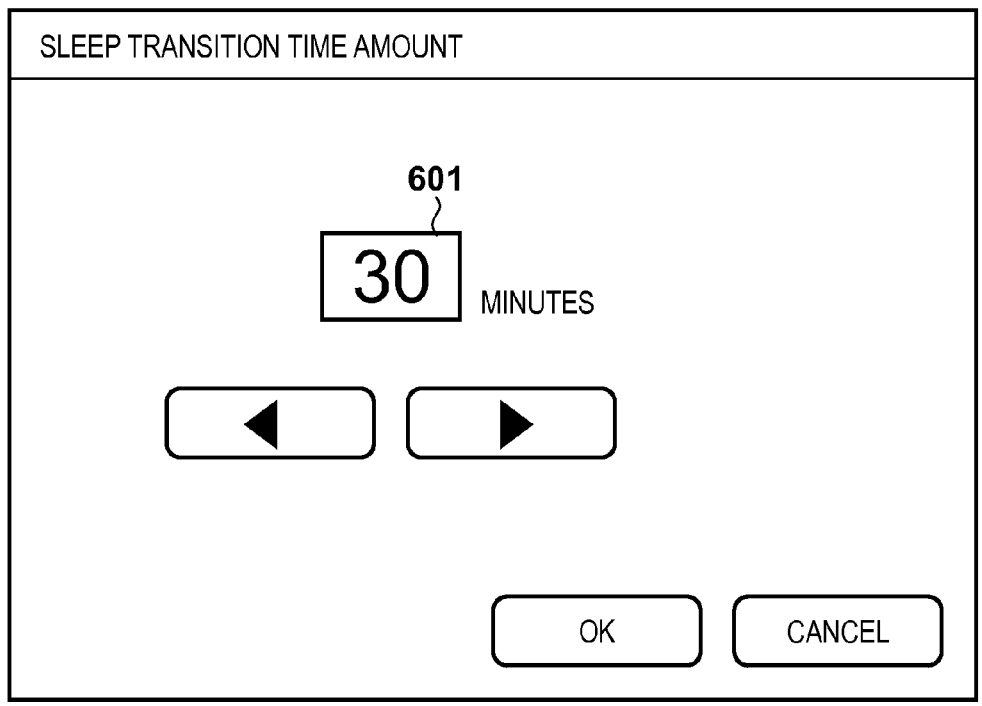
FIG. 6 is a diagram showing a screen for setting an amount of time for an image forming apparatus to transition to a sleep mode.
FIG. 7 is a diagram showing reference values for calculating amounts of transmission time for transmitting a job history.

FIG. 6 is a diagram showing an example of a setting screen for setting the amount of time until the image forming apparatus 102 transitions to the sleep mode. In FIG. 6, "30 minutes" is set as sleep mode transition time amount 601. In this case, the sleep control unit 404 sets a 30-minute timer when predetermined processing is complete in the image forming apparatus 102. The predetermined processing is processing that accompanies an instruction given by a user operation, and for example, is an operation of logging into the image forming apparatus 102, job execution, or display of a setting screen. Then, if the predetermined processing is not performed for 30 minutes, the sleep control unit 404 causes the image forming apparatus 102 to transition to the sleep mode. On the other hand, if predetermined processing is performed before 30 minutes elapse, the sleep control unit 404 resets the timer and once again sets the 30-minute timer.

In the case where the sleep mode transition time amount has been set as 30 minutes, if job execution is complete at 1:00 in the image forming apparatus 102 and job execution is not performed thereafter, the image forming apparatus 102 will transition to sleep mode at 1:30. Also, for example, if job execution is performed once again at 1:20, the timer for sleep will be reset at that point in time, and the scheduled time of the transition to the sleep mode will be updated to 1:50. If the setting screen shown in FIG. 6 is displayed on the display unit 306 and the user changes the sleep mode transition time amount using the input unit 305, the setting management unit 402 stores the changed value in the external storage device 304.

FIG. 7 is a diagram showing an example of reference values for calculating the amount of transmission time needed for the job history management unit 406 of the image forming apparatus 102 to transmit the job histories to the data processing server 103. The job history management unit 406 calculates the job history transmission time amount based on the reference values shown in FIG. 7 and, based on the state of the image forming apparatus 102, determines whether or not to transmit the job history to the data processing server 103.

In the table shown in FIG. 7, transmission time per page is specified according to the size and color of the image data that is to be subjected to the execution of the job. According to FIG. 7, a job history in which "A3"-sized color image data is the execution target will take 3000 milliseconds per page to transmit. Accordingly, the job history management unit 406 calculates 15 seconds as the transmission time amount for transmitting the job history in which 5 pages of "A3"-sized color image data is the execution target. Here, the transmission time amount is the required amount of time needed for transmission processing from when the contents that are to be subjected to the execution of the job are converted into a format for transmission, until when they are completely output from a communication device 309 to the network 105. However, another defined amount of time needed for transmission processing may be used as long as it changes according to the amount of contents.

Note that in FIG. 7, the transmission time amount is specified based on size and color, but the transmission time amount may be specified using another method. For example, it is possible to specify the transmission time amount based on the amount of data per page. Also, the reference values shown in FIG. 7 are fixed values that are pre-determined by the job history inspection system 100. However, they need not be fixed values, and a configuration is possible in which the table is updated as needed by a system administrator changing the values arbitrarily, or a value obtained by actually measuring the amount of transmission time in step S806 in FIG. 8, which will be described later, being automatically reflected in the table in FIG. 7.

Figure 8:
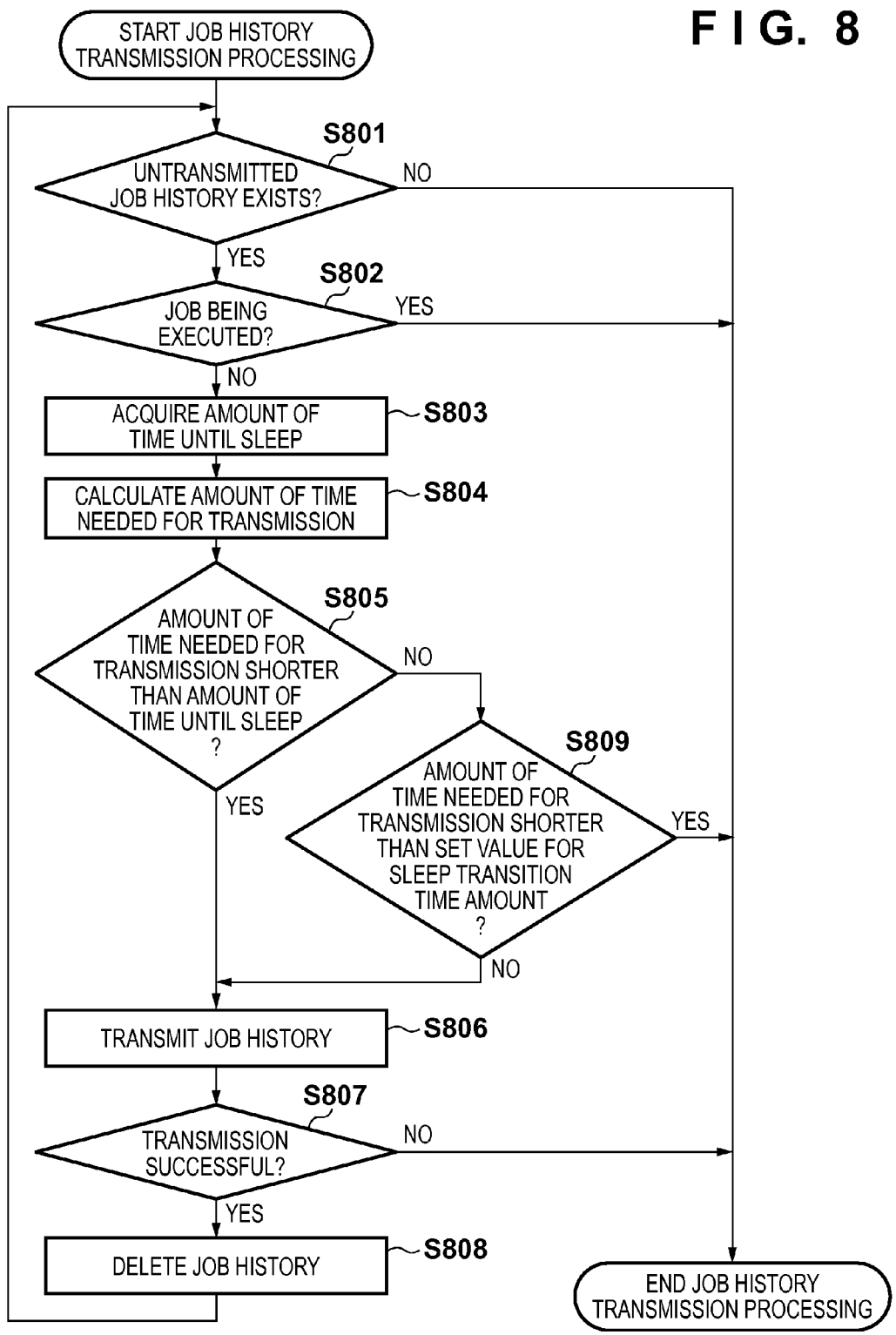
FIG. 8 is a diagram showing a procedure of job history transmission processing.

FIG. 8 is a flowchart showing a procedure of job history transmission processing in the image forming apparatus 102. The processing shown in FIG. 8 is realized by the CPU 301 reading out a program stored in the ROM 302 to the RAM 303 and executing it. Note that the job history transmission processing shown in FIG. 8 is executed repeatedly at a timing instructed in advance by the user using the job history inspection system 100. For example, the job history transmission processing shown in FIG. 8 is executed periodically at a predetermined time interval or at predetermined times. As will be described below, the job history transmission processing shown in FIG. 8 is performed upon confirming that the image forming apparatus 102 is not in the process of executing a job and is in a state in which an operation of transitioning to the sleep mode is not impeded.

First, in step S801, the job history management unit 406 determines whether or not a job history that has not been subjected to job history transmission processing shown in FIG. 8 exists in the external storage device 304. Here, if it is determined that a job history that has not been subjected to transmission processing exists, the procedure moves to step S802, and if it is determined that none exist, the job history transmission processing shown in FIG. 8 ends. After the job history transmission processing shown in FIG. 8 ends, if conditions for the image forming apparatus 102 to transition to the sleep mode are satisfied, the image forming apparatus 102 transitions to the sleep mode.

In step S802, based on the status of control of units such as the scanner unit 307 by the job control unit 403, the job history management unit 406 determines whether or not the image forming apparatus 102 is in the process of executing a job. Here, if it is determined that the image forming apparatus 102 is not in the process of executing a job, the procedure moves to step S803, and if it is determined that it is in the process of executing a job, the job history transmission processing shown in FIG. 8 ends.

In step S803, from the sleep control unit 404, the job history management unit 406 acquires the amount of time from the current time until when the image forming apparatus 102 transitions to the sleep mode. Here, if a user operation is not performed and conditions for transitioning to the sleep mode are satisfied before the processing of step S802, the timer until the sleep mode is activated. In this case, in step S803, the amount of time until the transition to the sleep mode can be acquired based on the timer. Also, in some cases, the conditions for transitioning to the sleep mode are not satisfied at the point in time of step S803. In such a case, the timer until the sleep mode is not activated, but the amount of time until the transition to the sleep mode may be set to be 24 hours for example, which indicates that it is not set.

In step S804, the job history management unit 406 references the table in FIG. 5 so as to acquire the content of the job history that is a transmission subject in the current job history transmission processing. Also, the job history management unit 406 calculates the amount of time needed to transmit the job history that is the transmission subject, based on the job history transmission time reference values shown in FIG. 7. In step S804, if multiple job histories corresponding to one job exist, a total value for the amount of time needed to transmit the job histories is calculated.

In step S805, the job history management unit 406 compares the amount of time until the transition to the sleep mode acquired in step S803 and the amount of time needed for transmission calculated in step S804 and determines whether or not to transmit the job history that is the transmission target to the data processing server 103 according to the comparison result. In the present embodiment, if it is determined that the amount of time needed for transmission is shorter than the amount of time until the transition to the sleep mode, it is determined that the job history that is the transmission target is to be transmitted to the data processing server 103, and the procedure moves to step S806. On the other hand, if it is determined that the amount of time needed for transmission is not shorter than the amount of time until the transition to the sleep mode, the procedure moves to step S809. In step S806, the job history management unit 406 transmits the job history that is the transmission target to the data processing server 103 via the data transmission/reception unit 401. Here, the job history that is the transmission target is a job history corresponding to one job. During the job history transmission processing in step S806, the sleep control unit 404 controls the power source unit so that the image forming apparatus 102 does not transition to sleep mode. Accordingly, in step S805, transmission of the job history corresponding to one job for which transmission was determined can be completed reliably.

In step S807, the job history management unit 406 determines whether or not the job history transmission processing of step S806 was completed normally. Here, if it is determined that it was completed normally, the procedure moves to step S808. On the other hand, if it is determined that the transmission processing did not complete normally due to the network 105 or the like, the job history transmission processing in FIG. 8 ends. If it is determined that it was not completed normally in step S807, attribute information "re-transmission required" is attached to the present job history, which is then stored in the external storage device 304, and the job history transmission processing is suspended. A suspended job history is subjected to transmission once again in the job history transmission processing shown in FIG. 8, which is performed once again after a predetermined amount of time has elapsed. At this time, in the next instance of job history transmission processing, for example, an attempt is made to perform transmission with priority given to the suspended job history over other job histories. On the other hand, in step S808, job histories that were transmitted in step S806 are deleted from the external storage device 304 by the job history management unit 406. Here, the job histories that are to be deleted are job histories corresponding to one job. After the deletion processing in step S808, the processing is repeated from step S801. In other words, in the present embodiment, by repeating the processing of steps S801 to S808 in units of jobs, transmittable job histories can be transmitted in units of jobs in the period of time until the transition to the sleep mode.

If it is determined in step S805 that the amount of time needed for transmission is not shorter than the amount of time until the transition to sleep mode, it is determined in step S809 whether or not the amount of time needed for transmission is longer than the sleep mode transition time amount 601 set using the setting screen shown in FIG. 6. Here, if it is determined that the amount of time needed for transmission is longer than the sleep mode transition time amount 601, the procedure moves to step S806, and if it is determined that it is less than or equal to the sleep mode transition time amount 601, the job history transmission processing in FIG. 8 ends. Also, if it is determined in step S809 that it is less than or equal to the sleep mode transition time amount 601, similarly to the above description, the attribute information "re-transmission required" is attached to the current job history, which is then stored in the external storage device 304, and the job history transmission processing is suspended.

It is thought that determining in step S809 that the amount of time needed for transmission is less than or equal to the sleep mode transition time amount 601 is almost the same as the amount of time needed for transmission being less than or equal to the sleep mode transition time amount 601. Accordingly, in the next instance of job history transmission processing, the current job history is processed first, for example, with priority over other job histories. By doing so, even if the timer for the sleep mode transition time amount has been activated in the next instance of job history transmission processing, it is determined in step S805 that the amount of time needed for transmission is shorter than the amount of time until the transition to the sleep mode, the procedure can move to step S806, and it is possible to prevent a delay in job history transmission from being repeated.

Also, if it is determined in step S809 that the amount of time needed for transmission is longer than the sleep mode transition time amount 601, transmission of the current job history cannot be completed within the amount of time set for the sleep mode transition time 601 in the first place. In other words, if the timer for the sleep mode transition time amount has been activated in the next instance of job history transmission processing, the job history transmission processing will be postponed once again. Accordingly, in order to prevent such a situation, it is determined that transmission will be performed at the current time, the procedure moves to step S806, and job history transmission is performed. If the procedure moves to step S806 after step S809, the sleep control unit 404 controls the power source unit so as to suppress the transition of the image forming apparatus 102 to the sleep mode, even if the sleep mode transmission time is reached during transmission of the current job history. When the transmission processing for the current job history is complete, the sleep control unit 404 causes the image forming apparatus 102 to transition to the sleep mode.

As described above, according to the present embodiment, the job history transmission processing is controlled with consideration given to the amount of time until the sleep mode transition time. Also, even in the case where it is determined that the amount of time needed for transmission is greater than or equal to the amount of time until the sleep mode transition time, if it is determined that it is less than or equal to the sleep mode transition time amount 601, transmission processing is attempted with a higher priority in the next instance of job history transmission processing. With this kind of configuration, it is possible to avoid a situation in which job history transmission is never performed. If it is determined in step S805 that the amount of time needed for transmission is greater than or equal to the amount of time until the sleep mode transition time, in principle, the job history transmission processing is carried over to the next instance of job history transmission processing, and therefore the transition of the image forming apparatus 102 to the sleep mode is carried out in principle.

Second Embodiment

Figure 9:
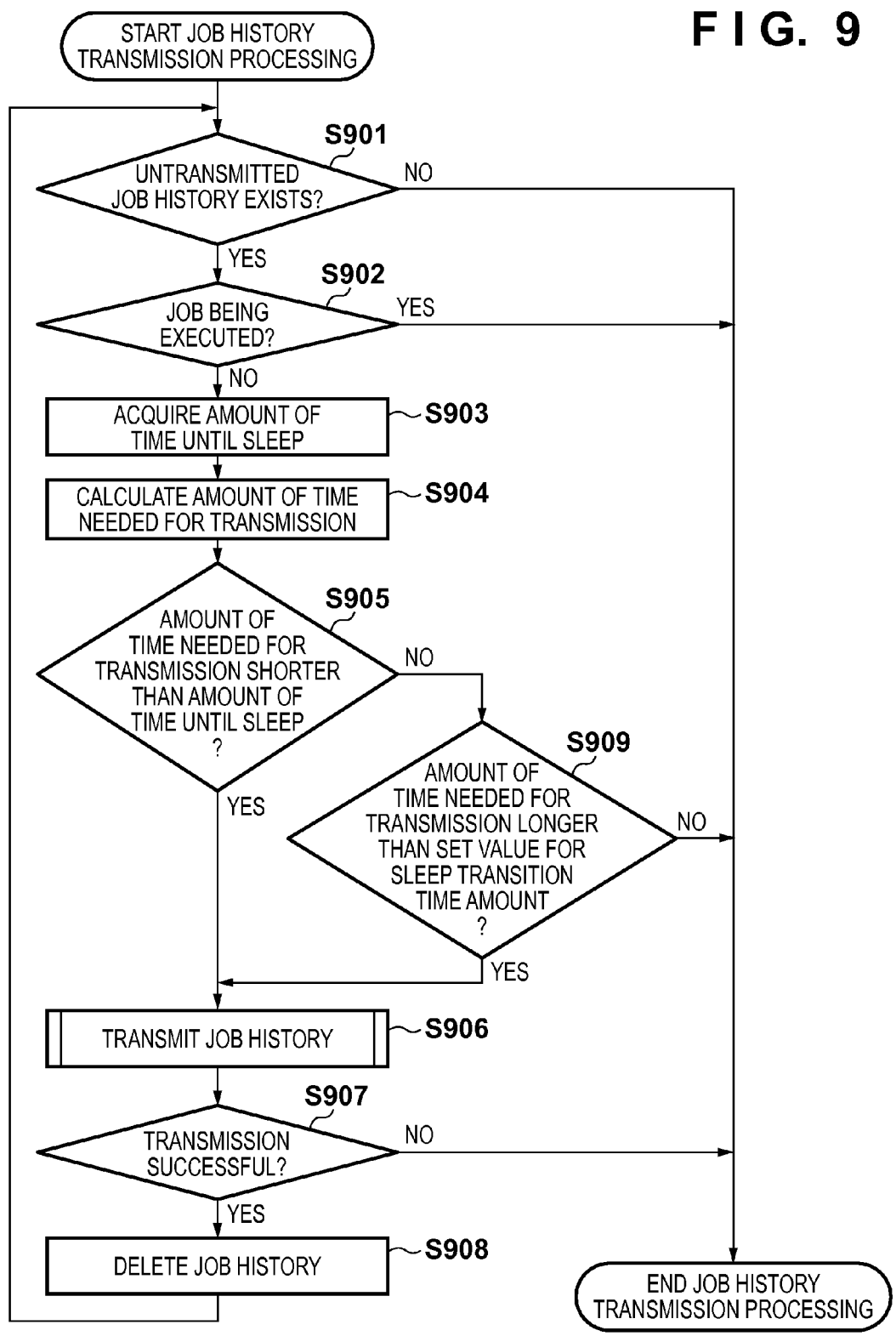
FIG. 9 is a diagram showing another procedure of job history transmission processing.

Hereinafter, a second embodiment will be described with a focus on differences from the first embodiment. FIG. 9 is a flowchart showing a procedure of job history transmission processing according to the present embodiment. Steps S901 to S905 and S907 to S909 in FIG. 9 correspond to the descriptions of steps S801 to S805 and S807 to S809 in FIG. 8. The description of step S906 in FIG. 9 will be described with reference to FIG. 10. Also, similarly to step S806 in FIG. 8, during the job history transmission processing in step S906, the sleep control unit 404 controls the power source unit so that the image forming apparatus 102 does not transition to the sleep mode.

Figure 10:
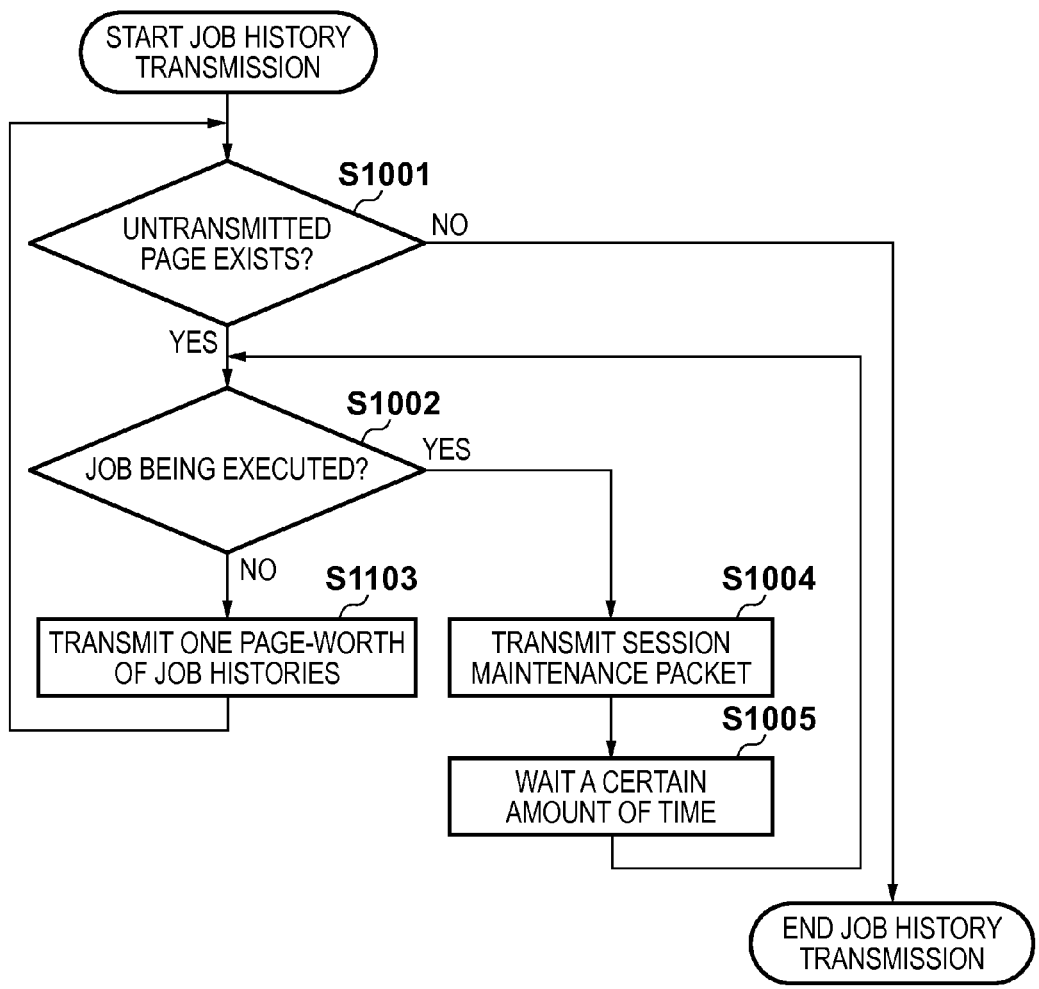
FIG. 10 is a diagram showing a procedure of processing for step S906 in FIG. 9.

FIG. 10 is a flowchart showing a procedure of processing for step S906 in FIG. 9. In step S1001, the job history management unit 406 determines whether or not an untransmitted page for which transmission processing is not complete exists among the job histories that are transmission targets. Here, if it is determined that an untransmitted page exists, the procedure moves to step S1002, and if it is determined that an untransmitted page does not exist, the job history transmission processing in FIGS. 10 and 9 ends.

In step S1002, the job history management unit 406 determines whether or not the image forming apparatus 102 is in the process of executing a job, based on the status of control of units such as the scanner unit 307 by the job control unit 403. Here, if it is determined that a job is not being executed, the procedure moves to step S1003, and if a job is being executed, the procedure moves to step S1004. Executing a job is a state in which a login operation or a job execution instruction has been received from a user, for example.

In step S1003, the job history management unit 406 transmits one page-worth of job histories to the data processing server 103 via the data transmission/reception unit 401. On the other hand, in step S1004, the job history management unit 406 transmits session maintenance packet data as a packet to the data processing server 103 via the data transmission/reception unit 401. The session maintenance packet data is the smallest amount of data needed to maintain the session so that the communication processing between the image forming apparatus 102 and the data processing server 103 does not time out. The communication processing here refers to a series of communication sessions for transmitting job histories corresponding to one job, for example. For example, HTTP KeepAlive data may be used as such data for session maintenance.

In step S1005, the job history management unit 406 waits for subsequent processing for a pre-determined amount of time, and thereafter, the procedure moves to step S1002. Here, the pre-determined amount of time is an amount of time for only executing step S1003 or step S1004 once again without the communication session timing out in the reception processing of the data processing server 103. With such a configuration, it is possible to perform control continuously such that priority is given to job execution by the image forming apparatus 102 and the job history transmission processing is not terminated due to a communication timeout.

As described above, according to the present embodiment, if job execution is started by the image forming apparatus 102 during job history transmission processing, the job history transmission processing is temporarily interrupted, and the session with the data processing server 103 is maintained. Also, the job history transmission processing is resumed after job execution is complete. With such a configuration, even if job execution is started during job history transmission, it is possible to perform job history transmission processing without causing the job execution speed of the image forming apparatus 102 to decrease.

Third Embodiment

Figure 11:
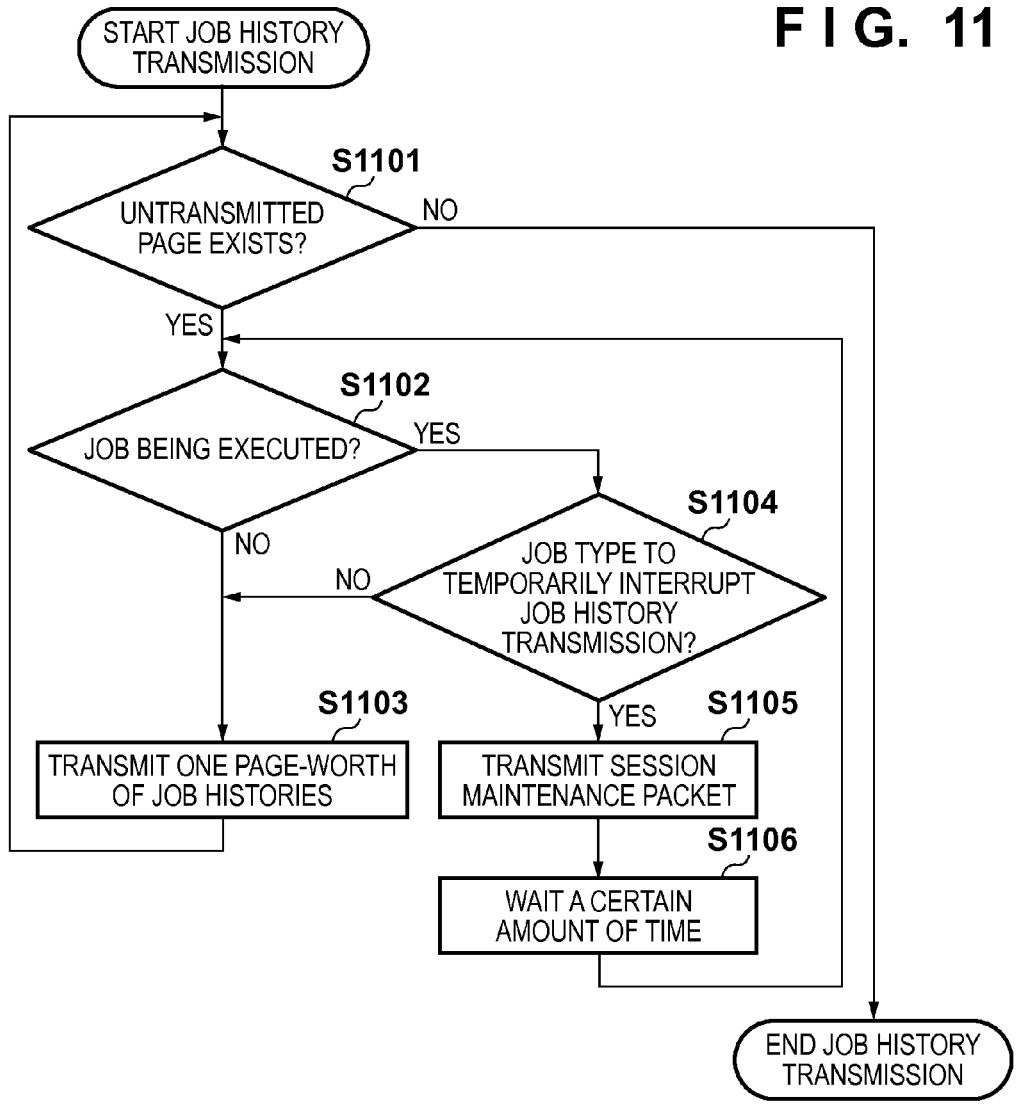
FIG. 11 is a diagram showing another procedure of job history transmission processing.

Hereinafter, a third embodiment will be described with a focus on differences from the first and second embodiments. FIG. 11 is a flowchart showing a procedure of job history transmission processing according to the present embodiment. Steps S1101 to S1103, S1105, and S1106 in FIG. 11 correspond to the descriptions of steps S1001 to S1003, S1004, and S1005 in FIG. 10.

FIG. 11 is a flowchart showing a procedure of the processing of step S906 according to the present embodiment. In the present embodiment, if it is determined in step S1102 that the image forming apparatus 102 is in the process of executing a job, the job history management unit 406 determines in step S1104 whether or not the type of job being executed in step S1102 is to temporarily interrupt job history transmission processing. The determination processing in step S1102 is performed with reference to the table in FIG. 12. If it is determined in step S1104 that it is a job type that temporarily interrupts job history transmission processing, the procedure moves to step S1105, and if it is determined that it is not a job type that temporarily interrupts job history transmission processing, the procedure moves to step S1103.

Figure 12:
FIG. 12 is a diagram showing a table for specifying job types of job that are to temporarily interrupt transmission processing.

FIG. 12 is a diagram showing an example of a table for specifying job types that are to temporarily interrupt job history transmission processing. The table in FIG. 12 is stored in advance in the external storage device 304 of the image forming apparatus 102. In FIG. 12, for example, copy (function of copying paper documents) and scan-fax (scan-fax function of scanning a paper document and faxing it) are specified as job types that are to temporarily interrupt job history transmission processing. In the present embodiment, jobs in which the user directly operates the image forming apparatus 102 via the operation unit in the vicinity of the image forming apparatus 102 are specified as job types that temporarily interrupt job history transmission processing since there is a high possibility that the user will feel a decrease in the job execution speed thereof. In other words, in the case of executing these types of jobs, it is possible to prevent a decrease in the job execution speed by temporarily interrupting the job history transmission processing, as shown in FIG. 11.

For example, job types that are executed while the user is away from the image forming apparatus 102, such as pc-print (a function of printing an electronic document from the PC 101 via the network 105) have a low possibility of the user feeling a decrease in the job execution speed caused by job history transmission processing. In other words, in the case where these types of jobs are executed, the job history transmission processing is not temporarily interrupted, as shown in FIG. 11.

As described above, according to the present embodiment, job history transmission processing is temporarily stopped only in cases where a job is executed which is of a type such that the user is likely to feel a decrease in the job execution speed. As a result, it is possible to prevent a case in which the user feels a decrease in the job execution speed and user-friendliness is decreased.

Fourth Embodiment

A description was given in which the job history transmission processing described in FIG. 8 and FIG. 9 is executed at a predetermined time interval for example, and at each time of execution, job histories that can be transmitted in the amount of time until the transition to the sleep mode are transmitted in units of jobs.

In the present embodiment, at a predetermined time, job histories for which job history transmission processing has not yet been executed are subjected to transmission processing while the transition to the sleep mode is suppressed. For example, during business hours from 9:00 am to 9:00 pm, the operations described in FIGS. 8 and 9 are performed. However, at a predetermined time such as 10:00 pm, which is not during business hours, priority is given to job history transmission processing, even upon reaching a time at which a transition to the sleep mode is to be performed.

Specifically, for example, before the processing of step S801 in FIG. 8, for step S800, it is determined whether or not it is a predetermined time, and if it is determined that it is not the predetermined time, the procedure moves to step S801. On the other hand, if it is determined that it is the predetermined time, all of the job histories stored in the external storage device 304 are transmitted to the data processing server 103.

Whereas conventionally a large amount of job histories had to be transmitted at a time according to a schedule only at a predetermined time during the night or the like, according to this application, an executable amount of job history transmission processing is executed during the daytime so that the transition to the sleep mode is not impeded. As a result, it is possible to reduce the load of schedule transmission during the night.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257398, filed Dec. 12, 2013, which is hereby incorporated by reference herein in its entirety.

What is claimed is:

1. An image forming apparatus configured to execute a job, the image forming apparatus comprising:
a memory; and
a processor in communication with the memory, the processor being configured to control:
a storage unit to store execution history information related to a job;
an acquisition unit to acquire an amount of time until a transition time at which the image forming apparatus transitions from a first operation mode in which a job can be executed, to a second operation mode in which an amount of consumed power is less than that of the first operation mode;
a transmission unit to transmit the execution history information stored in the storage unit to an external apparatus; and
a transmission control unit to control start of transmission of an execution history included in the execution history information stored in the storage unit to the external apparatus by the transmission unit,
wherein the transmission control unit performs control, within a predetermined time period, such that the transmission unit starts transmission of the execution history that has not yet been subjected to transmission by the transmission unit, while the transition from the first operation mode to the second operation mode is suppressed, and
wherein after a job is executed within a time period other than the predetermined time period, in a case where it is determined based on the amount of time acquired by the acquisition unit that transmission of the execution history corresponding to at least one job to the external apparatus can be completed before the transition time, the transmission control unit performs control such that the transmission unit starts to transmit the execution history corresponding to the at least one job.

2. The image forming apparatus according to claim 1, wherein in a case where an amount of transmission time needed for transmission of the execution history for which it has been determined based on the amount of time acquired by the acquisition unit that transmission of the execution history to the external apparatus cannot be completed before the transition time is longer than a pre-determined amount of time regarding the transition to the second operation mode, the transmission control unit performs control such that the transmission unit starts transmission of the execution history for which it has been determined that completion is not possible while the transition from the first operation mode to the second operation mode is suppressed.

3. The image forming apparatus according to claim 1, wherein the processor is further configured to control a determination unit to, in a case where the transmission control unit starts the transmission, determine whether or not an instruction for executing a job has been input, and
wherein in a case where it is determined by the determination unit that the instruction has been input, the transmission control unit temporarily interrupts the transmission performed by the transmission unit and transmits, to the external apparatus, a packet for preventing communication with the external apparatus from timing out.

4. The image forming apparatus according to claim 3, wherein in a case where the instruction is not an instruction obtained via an operation unit of the image forming apparatus, the transmission control unit continues the transmission performed by the transmission unit, even if it is determined by the determination unit that the instruction has been input.

5. The image forming apparatus according to claim 3, wherein the job includes at least one of a print job, a copy job, a transmission job, and a fax job.

6. The image forming apparatus according to claim 1, wherein the second operation mode includes a sleep mode or a power off state.

7. The image forming apparatus according to claim 1, wherein the processor is further configured to control a second acquisition unit to, based on data corresponding to the execution history and an amount of transmission time for a predetermined data unit, acquire an amount of transmission time needed for transmission of the execution history, and
wherein in a case where the amount of transmission time acquired by the second acquisition unit is shorter than the amount of time acquired by the acquisition unit, it is determined that transmission of the execution history to the external apparatus can be completed before the transition time.

8. The image forming apparatus according to claim 1, wherein in a case where it is determined based on the amount of time acquired by the acquisition unit that transmission of the execution history corresponding to at least one job to the external apparatus cannot be completed before the transition time, the transmission control unit suspends transmission thereof by the transmission unit.

9. The image forming apparatus according to claim 8, wherein in a case where it is determined based on the amount of time acquired by the acquisition unit that transmission to the external apparatus of the execution history whose transmission by the transmission unit was suspended can be completed before the transition time, the transmission control unit starts transmission processing of the execution history with priority over another execution history.

10. A control method executed by an image forming apparatus configured to execute a job, the control method comprising:
acquiring an amount of time until a transition time at which the image forming apparatus transitions from a first operation mode in which a job can be executed, to a second operation mode in which an amount of consumed power is less than that of the first operation mode;
transmitting execution history information relating to a job stored in a storage unit configured to store the execution history information to an external apparatus; and
controlling start of transmission, in the transmitting step, of an execution history included in the execution history information stored in the storage unit to the external apparatus,
wherein the controlling step is performed, within a predetermined time period, such that the transmitting step starts transmission of the execution history that has not yet been subjected to transmission in the transmitting step, while the transition from the first operation mode to the second operation mode is suppressed, and
wherein after a job is executed within a time period other than the predetermined time period, in a case where it is determined based on the amount of time acquired in the acquiring step that transmission of the execution history corresponding to at least one job to the external apparatus can be completed before the transition time, control is performed in the controlling step such that transmission of the execution history in the transmitting step is started.

11. A non-transitory computer-readable storage medium storing a program for causing a computer to execute a control method comprising:
acquiring an amount of time until a transition time at which an image forming apparatus transitions from a first operation mode in which a job can be executed, to a second operation mode in which an amount of consumed power is less than that of the first operation mode;
transmitting execution history information relating to a job stored in a storage unit configured to store the execution history information to an external apparatus; and
controlling start of transmission, in the transmitting step, of an execution history included in the execution history information stored in the storage unit to the external apparatus,
wherein the controlling step is performed, within a predetermined time period, such that the transmitting step starts transmission of the execution history that has not yet been subjected to transmission in the transmitting step, while the transition from the first operation mode to the second operation mode is suppressed, and
wherein after a job is executed within a time period other than the predetermined time period, in a case where it is determined based on the amount of time acquired in the acquiring step that transmission of the execution history corresponding to at least one job to the external apparatus can be completed before the transition time, control is performed in the controlling step such that transmission of the execution history in the transmitting step is started.

* * * * *